United States Patent [19]
Todter et al.

[11] Patent Number: 5,937,070
[45] Date of Patent: Aug. 10, 1999

[54] NOISE CANCELLING SYSTEMS

[76] Inventors: Chris Todter, 677 Catalina Blvd., San Diego, Calif. 92106; Scott Clifton, 53-55 Shephard St., Marrickville, NSW 2204; Paul Bremner, 2 Gray Street, Henley, NSW 2111, both of Australia

[21] Appl. No.: 08/538,077

[22] Filed: Oct. 2, 1995

Related U.S. Application Data

[63] Continuation of application No. 08/030,062, filed as application No. PCT/US91/06636, Sep. 13, 1991, abandoned.

[30] Foreign Application Priority Data

Sep. 14, 1990 [AU] Australia ................................. PK2311

[51] Int. Cl.⁶ ..................................................... G10K 11/16
[52] U.S. Cl. ..................... 381/71.6; 381/71.8; 381/71.12; 381/94.7
[58] Field of Search .............................. 381/71, 94, 71.6, 381/71.12, 71.11, 71.8, 92, 94.7

[56] References Cited

U.S. PATENT DOCUMENTS

| | | | |
|---|---|---|---|
| 3,992,585 | 11/1976 | Turner et al. | 381/110 |
| 4,481,662 | 11/1984 | Long et al. | 381/98 |
| 4,483,015 | 11/1984 | Strohbeen | 381/98 |
| 4,504,704 | 3/1985 | Ohyaba et al. | 381/98 |
| 4,594,695 | 6/1986 | Garconnat | 381/71 |
| 4,596,033 | 6/1986 | Swinbanks | 381/71 |
| 4,672,674 | 6/1987 | Clough et al. | 381/71 |
| 4,677,676 | 6/1987 | Eriksson | 381/71 |
| 4,741,038 | 4/1988 | Elko et al. | 381/92 |
| 4,783,817 | 11/1988 | Hamada et al. | 381/71 |
| 4,783,818 | 11/1988 | Graupe | 381/71 |
| 4,845,757 | 7/1989 | Wagner | 381/93 |
| 4,953,217 | 8/1990 | Twiney et al. | 381/71 |
| 4,956,867 | 9/1990 | Zurek et al. | 381/94.7 |
| 4,985,925 | 1/1991 | Langberg et al. | 381/71 |
| 5,018,202 | 5/1991 | Takahashi et al. | 381/71 |
| 5,033,082 | 7/1991 | Eriksson et al. | 381/71 |
| 5,046,103 | 9/1991 | Warnaka et al. | 381/71 |
| 5,091,954 | 2/1992 | Sasaki et al. | 381/71 |
| 5,117,461 | 5/1992 | Moseley | 381/71 |
| 5,138,664 | 8/1992 | Kimura et al. | 381/71 |

*Primary Examiner*—Forester W. Isen
*Attorney, Agent, or Firm*—Thomas J. Tighe

[57] ABSTRACT

A first major aspect of the invention relates to an active noise cancelling system which detects ambient noise and applies electro-accoustic processing thereto to produce an acoustic signal for cancelling out the ambient noise. The active noise cancelling system may be used to cancel all noise but an audio signal which is desired to be heard by the user. A second major aspect of the invention relates particularly to a system for electronically cancelling noise input to a user microphone, by utilizing known characteristics of speech signal and ambient noise. The first major aspect of the invention can be used in concert with the second major aspect in a communication system at the earpiece of a telephone and the mouthpiece of a telephone.

27 Claims, 12 Drawing Sheets

NOISE CANCELLING SYSTEMS

This Application is a continuation of application Ser. No. 08/030,062, filed on Aug. 12, 1993, now abandoned. This application is based on Australia Application No. PK 2311, filed on Sep. 14, 1990 and PCT/US91/066,361, filed on Sep. 13, 1991.

TECHNICAL FIELD

The present invention relates generally to noise cancelling systems, and in particular to noise cancelling systems which operate to reduce undesired ambient acoustic noise for a user.

BACKGROUND ART

In a first main aspect the invention relates particularly to an active noise cancelling system which detects ambient noise and applies electro-acoustic processing thereto to produce an acoustic signal for cancelling out the ambient noise. The active noise cancelling system may be used to cancel all noise but for an audio signal which is desired to be heard by the user.

In a second main aspect the invention relates particularly to a system for electronically cancelling noise input to a user microphone, by utilizing known characteristics of speech signal and ambient noise.

The first main aspect of the invention can be used in concert with the second main aspect in a communication system (e.g. telephone network) to provide cancellation of both ambient noise in the vicinity of the earphone outputting the received audio signal (e.g. telephone earpiece) and electronic cancellation of ambient noise being received at an input microphone to the communication system (e.g. telephone mouthpiece).

Other aspects of the invention relate respectively to speaker stability compensation in a closed loop feedback system for driving a loudspeaker, an adaptive control device and method for adjusting parameters of a closed loop noise cancelling system in order to optimize noise cancellation a method and apparatus for providing a power supply for audio signal processing equipment, a method and apparatus for minimizing power consumption in sound processing equipment (e.g. noise cancellation and/or audio signal processing equipment), and provision of an accoustic waveguide to enhance noise cancelling performance of a noise cancelling system.

There are many applications where an efficient noise cancelling system is desirable. Such applications include, for example, "ear protection" in industry, noise cancellation for communications headsets in aircraft, noise cancellation in general communications systems such as telephone systems, etc.

Previous approaches to the problems of noise include the provision of ear protectors to try and physically block out ambient noise. This is an approach used particularly in noisy industrial environments where a worker may be exposed to high noise levels which could result in damaged hearing after prolonged exposure. Unfortunately, such ear protectors tend to be "leaky" and therefore still let some noise through, particularly at lower frequencies as well as being generally bulky and uncomfortable to wear.

It has also been proposed to cancel noise in a known predefined space by sensing the noise with sensors placed at known parts in the area and producing an audio signal of the same magnitude and 180 degrees out of phase with the noise to cancel the noise (see in particular patent publication WO89/11841). However, the processing involved in such a noise cancellation system is extremely complex and can only be designed to cancel synchronous, repetitive background noise and not intermittent noise which does not occur at regular intervals. This intermittent noise will still be heard by the user. Another example of disclosure relating to the cancellation of repetitive noise is given in Australian patent application number AU 85255/82.

It is known to provide Active Noise Cancelling (ANC) by providing a microphone to sense ambient noise and an earphone placed in the vicinity of the microphone to produce a noise cancelling acoustic signal. However, such a noise cancelling system is only effective over very narrow frequency ranges. Noise falling outside the effective frequency range of the system will still be a problem. An original patent to Olsen (1953) discloses such a system. A microphone placed near the user's ear detects noise and is used to electrically drive an earphone loudspeaker. By increasing the electronic gain in the cancellation loop a frequency is found where the loudspeaker audio signal is equal in magnitude and opposite in phase with the external noise pressure wave at the listener's ear, causing attentuation of the noise. This electromechanical phenomenom is commonly known as "Active Noise Control" (ANC). Unfortunately, it is only effective over a narrow frequency range, as discussed above. This range is too narrow to cause sufficient attentuation of noise over a satisfactory range for most practical applications.

There is therefore a need for an active noise cancelling system that is effective over a wide range for practical noise cancelling applications.

The microphone/speaker ANC arrangement forms a closed loop system which will have particular electro-acoustic transfer function characteristics.

For frequencies below the first flexural (acousto-mechanical) resonance of the speaker or microphone we have found that the open loop electro-acoustic transfer function of any microphone/speaker arrangement is predominantly determined by the loudspeaker suspension resonance characteristic. With knowledge of this it becomes possible to calculate, i.e., mathematically model the electro-acoustic transfer function of any particular microphone/speaker ANC arrangement for at least the frequencies which are below the first flexural resonance of the speaker or microphone, which tend to be the frequencies, for most standard microphones/speakers, which one is interested in with regard to audio noise cancelling.

In order to provide wide frequency band noise cancellation a closed loop electro-acoustic transfer function of negative unity is required for the microphone/speaker ANC closed loop system so that the audio signal produced at the speaker is of the same magnitude and 180 degrees out of phase with the noise signal for at least the wide frequency range within which noise cancellation is required. In previous systems such a negative unity transfer function is not obtained over the desired range.

DISCLOSURE OF THE INVENTION

In the present invention, the open loop transfer function of the microphone/speaker system is calculated and, based on the calculated model, signal compensation is performed within the microphone/speaker system, the signal compensation being designed to have a characteristic which is the inverse of the open loop transfer function of the microphone/speaker system over the frequency range desired for noise cancellation, so that when closed loop noise cancellation is performed the closed loop microphone/speaker ANC feedback system with compensation has a total transfer function of substantially negative unity over the desired range, i.e. the signal compensation characteristic compensates for the transfer characteristic of the microphone/speaker system.

The transfer function of the speaker/microphone system, governed predominantly by the loudspeaker suspension resonance characteristic (at least below the first flexural resonance of the speaker or microphone), is of fairly straight-forward form, so the inverse signal compensation characteristic may be implemented in quite simple fashion, by a two pole analog bandpass filter, for example.

Some phase compensation may be performed for signal frequencies above the first flexural resonance of the speaker and microphone.

From a first aspect the present invention provides noise cancelling apparatus comprising a speaker and a microphone arranged to be placed in the vicinity of each other, the microphone being electrically connected to drive the speaker in a closed loop feedback system for attenuating noise in the vicinity of the microphone/speaker arrangement, and compensation circuitry provided within the feedback loop for providing a transfer function substantially the inverse of the open loop transfer function of the microphone/speaker arrangement for a predetermined frequency range, whereby to give a total closed loop electro acoustic transfer function for the noise cancelling apparatus of substantially negative unity over the predetermined frequency range.

The predetermined frequency range preferably extends below the first flexural resonance frequency of the speaker and microphone. Below this frequency the open loop transfer function of the speaker/microphone arrangement is predominately governed by the loudspeaker suspension resonance characteristic and may be calculated and can be simply implemented.

Further circuit means are also preferably provided for applying some phase compensation above the first flexural resonance frequency, in order to provide some degree of avoidance of audio feedback instability.

The compensation circuitry may comprise a simple two pole analog bandpass filter which can be optimized to obtain the required negative unity closed loop electro-acoustic transfer function over the wide frequency desired.

In a preferred embodiment the compensation circuitry is implemented in two stages, being an ANC gain compensation block for achieving amplitude scaling and an ANC phase compensation block for achieving tuning.

Noise cancelling apparatus in accordance with the present invention may be utilized to provide "ear protection", in industry, for example. For example, apparatus in accordance with the present invention could be mounted on the earpieces of a headset (i.e. one microphone/speaker ANC loop for each earpiece) to provide noise cancelling in the area where the earpiece is positioned adjacent the ear of the user.

In many applications (e.g. communications systems) it is required that the user be able to hear a desired audio signal (e.g. speech signal from telephone earpiece) whilst unwanted external noise be supressed. The present invention may be applied to allow a desired audio signal to remain substantially unattenuated whilst providing attenuation of external noise.

In this case input means are provided in the noise cancelling apparatus to allow input of the audio signal (i.e. in electrical signal form) and additional means are provided for adding the input audio signal to a noise cancelling electrical signal output from the compensation circuitry. The noise cancelling electrical signal output from the compensation circuitry is what would normally be used to drive the speaker if there was no audio signal desired to be heard. With the audio signal, however, the acoustic signal received by the microphone comprises unwanted noise plus wanted audio signal. If the loop were to operate normally an acoustic signal would be produced at the speaker which would operate to attenuate both noise and acoustic audio signal. However, by adding the audio signal into the loop to the speaker driving signal, the speaker will be driven to attenuate the noise only, and not the desired audio signal.

The present invention further provides a method of noise cancellation in a speaker/microphone closed loop feedback system, comprising the step of providing signal compensation within the loop, the signal compensation transfer characteristic being arranged to be substantially the inverse of the open loop transfer function of the microphone/speaker arrangement for a predetermined desired frequency range, whereby to give a total closed loop electro acoustic transfer function approaching negative unity over the predetermined frequency range.

The predetermined frequency range may be as discussed above in relation to the apparatus of this aspect of the present invention.

Preferably, where a user desires to receive an audio signal transmitted from some other point, the method includes the step of adding the audio signal into the loop feedback system to a noise cancellation signal produced for driving the speaker, whereby the speaker will produce a noise cancelling acoustic signal plus an acoustic audio signal.

This aspect of the present invention has the advantage that noise cancellation over a wider range frequency range than the prior art speaker/microphone ANC system, and the signal compensation may be simply implemented by means of an analog two pole filter, for example. No complex digital processing is required, although the inventive apparatus may be implemented digitally if required.

Further, this aspect of the present invention has the advantage of employing real time processing, so that the noise is basically attenuated as it is produced i.e. even most intermittent noise will be attenuated to some extent. This is unlike prior art digital filter type circuits where a great deal of delay is introduced by the digital processing.

Due to the simplicity of the apparatus this aspect of the present invention can be mounted in compact and convenient form, in, for example, the earpiece of a user headset.

In any pick-up (microphone)/speaker system, at a frequency near the first flexural resonance of speaker or microphone the Open Loop Transfer Function (OLTF) of the system can cross zero or 360 degrees as regards phase, while the electro-acoustic gain is greater than or equal to unity. For a closed loop microphone/speaker arrangement any signal input to the microphone at this frequency will cause an audio feedback "squeal". This is obviously undesirable.

From a second aspect, the present invention provides speaker stability compensation means for evasion of audio feedback instability in a closed loop speaker/microphone system, the speaker stability compensation means comprising means for applying predetermined phase and gain compensation to a frequency band where the closed loop feedback characteristics would otherwise lead to audio feedback instability on the system, whereby to substantially evade feedback instability of the system.

Generally, the frequency band with which the speaker stability compensation means is concerned will be a frequency band at or near the first flexural resonance of the speaker or microphone, as discussed above.

The speaker stability compensation means preferably comprises a high Q "notch" filter set at the frequency resonance point.

The filter is preferably a multi-pole analog notch filter having two important characteristics:

1. a very sharp gain roll-off to the notch centre frequency, which compensates for the high-Q gain of the first flexural resonance, and
2. an increasing phase characteristic, from 0 to +90 degrees at the notch centre frequency, which provides a phase margin up to higher frequencies, until the open loop transfer function ("OLTF") gain drops below unity.

Both notch frequency and Q value are preferably tunable to provide the desired stability margins.

The present invention further provides a method of combating audio feedback instability in a closed loop speaker/microphone system, comprising the step of applying predetermined phase and gain compensation to a frequency band where the closed loop feedback characteristics would otherwise lead to audio feedback instability of the system, whereby to substantially evade feedback instability of the system.

The frequency band generally concerned will be as discussed above in relation to the apparatus of this aspect of the invention.

The gain compensation applied is preferably such as to give a very sharp gain roll-off to the frequency resonance point of the speaker, and the phase compensation applied is preferably such as to give an increasing phase characteristic, from 0 degrees to 90 degrees at the frequency resonance point of the speaker.

The second aspect of the invention may be applied in a noise cancelling system and process as described in relation to the first aspect of the invention. In this case, the audio feedback stability compensation is advantageously applied after the signal compensation has been applied in the feedback loop. In this way both parts of the open loop transfer function of the microphone/speaker system are dealt with by the noise cancelling system so embodied. At frequencies below the first flexural resonance frequency of the speaker signal compensation is applied in accordance with the first aspect of the invention to give unity transfer function in the frequency range where most of the noise occurs. At and above the first flexural resonance frequency speaker stability compensation is applied in accordance with the second aspect of the invention to prevent feedback instability from degrading the noise cancellation response of the system.

In prior art microphone/speaker feedback systems attempts have been made to provide speaker stability compensation using phase compensation techniques only. These provide insufficient compensation to deal with the high Q speaker resonance without adversely affecting the phase integrity in the frequency range of interest.

When the speaker stability compensation technique of this aspect of the present invention is used with a noise cancellation technique in accordance with the first aspect of the invention it advantageously makes it possible to provide the gain necessary for good noise cancellation without instability feedback problems.

In any noise cancelling system comprising a closed loop microphone/speaker feedback arrangement, no matter how good the noise cancellation performance the performance is subject to variation in operation in dependence on a number of variables, such as, for example, variation in components of the system, changes in device/user physical interface (e.g. when adjusted on the user's ear or moved to another user) and electro acoustic transmission characteristics.

In the third aspect of the present invention a means and method are provided which advantageously allow adaptation of the noise cancelling system to reduce any performance degradation caused by variation in operating characteristics of the system.

From a third aspect the present invention provides an model-based adaptive controller arranged to monitor a predetermined signal or signals from a noise cancelling system which is/are indicative of changes in the electro-acoustic transfer function of the system, and to adjust the operation of the noise cancelling system in accordance with the signal or signals, whereby to provide compensation for any such changes.

Preferably, the adaptive controller measures the residual noise (after cancellation) and determines what adjustment to the operation of the noise cancelling system is necessary to improve the noise cancellation system.

Preferably, the type of noise cancelling system to which the adaptive controller of this aspect of the invention is applied is a closed loop feedback microphone/speaker type noise cancelling arrangement. The signals monitored are preferably the microphone signal, i.e. the electrical signal produced by the microphone in response to the acoustic pressure wave impinging thereon, and the electrical noise cancelling signal produced in the feedbback loop, which is usually the speaker drive signal, i.e. the electrical signal used to drive the speaker or speaker drive circuit. These signals are processed, preferably by comparing predetermined parameters thereof, such as phase, and gain, and the operation of the noise cancelling system is adjusted in accordance with the comparison.

As mentioned above in relation to the first aspect of the invention, a noise cancelling system may be used to cancel unwanted noise but to allow acoustic production of a desired audio signal. The audio signal will also be affected by changes in the electro-acoustic transfer function of the system and will also be subject to degradation due to inadequacies of the system such as inadequacies in the earphone.

By applying the audio signal to the adaptive controller in accordance with this aspect of the invention, we have found that it is possible to control the noise cancelling system to effectively provide precompensation to the audio signal applied to the speaker, whereby to provide compensation for any inadequacies of the system, such as poor speaker quality. That is, as well as the audio signal being input to a noise cancelling system so that it will be heard by the user (see above in relation to the first aspect of the invention, for example,) it is preferably also input to the adaptive controller of the present invention, being used essentially as a reference signal so that the noise cancelling system may produce an audio signal tending towards the audio reference signal, notwithstanding electro acoustic transfer function variations or poor quality components.

Where this aspect of the invention is applied in a closed loop microphone/speaker type noise cancelling arrangement arranged to pass an audio signal to a user, the audio signal is also preferably input to the adaptive controller and negatively summed with the electrical noise cancelling signal produced in the feedback loop (which, in such a case, will comprise components of actual noise cancelling signal and audio signal) to produce a residual signal for comparison with the microphone signal.

The present invention further provides a method of adaptive model-based control of a noise cancelling system comprising the steps of monitoring a predetermined signal or signals from the noise cancelling system which is/are indicative of changes required in the electro acoustic transfer function parameters of the system, and adjusting the operation of the system in accordance with the signal or signals, whereby to provide compensation for any such changes.

The function of the adaptive control is preferably to measure the residual noise (after cancellation) and determine what adjustment to the noise cancelling system is necessary to improve the noise cancellation performance.

The adaptive control method is preferably applied to a closed loop feedback microphone/speaker type noise cancelling arrangement as discussed above in relation to the apparatus form of this aspect of the invention, the signals utilized being the microphone signal and the electrical noise cancelling signal.

Where the noise cancelling system is arranged to pass a desired audio signal to a user, the audio signal (reference audio signal) is also used in the adaptive control method whereby to provide a precompensation function, as discussed above in relation to the apparatus form of this aspect of the invention.

The adaptive control method and apparatus may be combined with any or both of the first two aspects of the present invention. The total advantageously results in a complete noise cancellation system having improved performance.

Because of the advantageous ability of the adaptive control system to provide compensation for inferior components in audio signal processing noise cancellation systems, the system can be applied to improve the performance of generally inferior microphone/speaker systems, to basically provide high fidelity audio from any speaker.

The adaptive control should not be confused with normal noise cancellation loop compensation control. The adaptive control actually operates to affect the cancellation loop control law.

In any signal processing circuitry it is desirable to be able to minimize power consumption to save the power supply, e.g. battery.

In a fourth aspect, the present invention provides apparatus for controlling the application of a power supply for signal processing circuitry, comprising switch means which is actuated by use of the signal processing circuitry, whereby to cause application of the power supply to the signal processing circuitry.

The switch means may be, for example, a force activated switch (e.g. pressure switch) provided in the earphone housing of a noise cancelling and/or audio signal processing device, such as a personal stereo or "ear protection" noise cancellation system, which is activated only when the earphone housing is contacted by the user's head or ear.

The present invention further provides a method of controlling the application of a power supply for signal processing circuitry, comprising the steps of determining when the circuitry is to be used and causing application of the power supply to the signal processing circuitry in response to the determination.

The determination may be made by means of a force activated switch, as discussed above in relation to the apparatus form of this aspect of the invention.

Power supply application control in accordance with this aspect of the invention may be applied with any or all of the first three aspects of the present invention discussed above, in order to save power consumption of the signal processing activity when it is not being used. For example, it could be used to control power application to noise cancelling circuitry in accordance with the invention (which may include audio feedback stability and adaptive control) utilized is a ear protection type headphone or in a personal stereo cassette player.

From a fifth aspect the present invention provides apparatus for providing power to signal processing circuitry, comprising means for extracting power from a signal external to the processing circuitry and providing the power for supply of the processing circuitry.

The means for extracting the power preferably comprises a rectifier.

The power extracted from the signal may be used to charge a battery, for example, which acts as a power supply for the signal processing circuitry.

The present invention further provides a method of providing power for signal processing circuitry comprising the steps of extracting power from a signal external to the processing circuitry and providing the extracted power for supply of the processing circuitry.

As discussed above the extracted power may be used to charge a battery.

This aspect of the invention is most useful in audio signal processing systems where the audio signal is provided from an external source, e.g. aircraft audio entertainment network, noise cancelling circuitry for a communication system, noise cancelling circuitry for a personal stereo, etc. The power can be "stolen" from the audio signal by application of this aspect of the invention.

In a noise cancelling system, such as that described in relation to the above described aspects of the present invention, for example, where there is sufficient audio signal input the noise cancelling circuitry can be virtually powered by power "stolen" from the input signal without it being necessary to draw on any other power supply.

By utilizing either or both of the above two aspects of the invention with closed loop type feedback systems such as described in relation to the first three aspects of the invention, a noise cancellation system can be provided which requires only a small power source (e.g. solar cell or small battery), and yet can still be powered for long periods.

Because it is possible to drive such a noise cancelling system from a small and compact power supply the whole system apparatus, including the power supply, may be mounted in a small area, such as for example, in an earphone housing of a communications headset (e.g. telephone earpiece, personal stereo earphones, etc.).

The power stealing and power management system aspects of the invention advantageously make extended use of ANC in personal communications devices (e.g. telephone systems) practical, with the very least battery or power source.

A further noise problem arises in two way communication systems, such as telephone communication systems, for example, in relation to noise entering the system pick up or microphone. For example, the microphone of a telephone handset will not only pick up the user's voice signal but will also pick up any ambient noise present at the microphone. This noise will become part of the microphone electrical audio signal to be transmitted over the communication system to the earpiece of the receiving telephone handset. Notwithstanding any noise cancellation applied at the earpiece of the receiving handset, the "microphone noise" transmitted with the audio signal will form part of the acoustic audio signal actually heard by the user. This is because it will be seen as being "audio signal" by the receiver noise cancellation system and therefore will not be attenuated.

It is therefore desirable to try and eliminate the noise which is introduced at the microphone or pick up of a communications system to prevent it forming part of the received audio signal to the user.

From a sixth aspect the present invention provides apparatus arranged to attenuate noise received by a pick up or microphone of an audio signal processing system, comprising processing means for processing the pick up or microphone signal in accordance with known predictable differences between the nature of the noise sound field and any desired audio signal sound field, whereby to provide attenuation of the noise signal.

This preferably acts to provide electronic cancellation of extraneous noise at the microphone.

Preferably, a plurality of pick ups or microphones are provided (e.g. in a telephone handset) at known positions in relation to the source of the desired audio signal, so that all microphones will receive the desired audio signal (albeit possibly with gain and phase differences) and all microphones will receive the extraneous noise signal (again possibly with gain and phase differences). The signals from each microphone may then be separately processed to provide electrical noise cancellation and added (possibly with appropriate weighting) to give the noise cancelled audio signal. The noise cancelling processing may make use of known propagation characteristic differences between the ambient noise field and the desired audio signal acoustic field.

Preferably, a different processing strategy is used in different frequency ranges to give attenuation across a wide band of frequencies. Noise signals tend to behave differently at high and low frequencies. Different processing may therefore be applied at high and low frequencies to give noise cancellation of the separate frequency ranges. After processing, signals from the high and low frequency ranges are preferably summed to give a noise attenuated audio signal across a wide frequency range.

The present invention further provides a method of attenuating noise received by a pick up or microphone of an audio signal processing system, comprising the step of processing the pick up or microphone signal in accordance with known predictable differences between the nature of the noise sound field and any desired audio signal sound field, whereby to provide attenuation of the noise signal.

Preferably, a plurality of pick-ups of microphones are provided, the signals from each being separately processed and added to give the noise cancelled audio signal, as discussed above in relation to the apparatus form of this aspect of the invention.

Further, a different processing strategy may be used for processing signals in different frequency ranges across a wide frequency range, as discussed above.

This aspect of the present invention is preferably applied in signal communication systems, such as for example, telephone systems, communication systems in aircraft, etc, to reduce interfering noise in the received audio signal due to extraneous microphone noise.

However, it is not restricted to use in communications systems only, and may have other applications where extraneous microphone or pickup noise is a problem, tape recording devices, for example.

This aspect of the present invention may be utilized with any or all of the other aspects described above to provide, for example, a communication system which comprises earphone noise cancelling in accordance with the first aspects of the invention and microphone noise cancelling in accordance with this aspect.

The desired audio signal need not necessarily be a voice signal but could be any other desired signal, preferably issuing from a known point.

In regard to microphone or pick up housing which may be used in a communication system (e.g. telephone handset), it is possible to design such a housing which emphasizes already known differences between an acoustic noise field and a desired acoustic audio signal field.

From a seventh aspect, the present invention provides a housing for mounting a microphone or pick up, the housing being shaped to emphasize known predetermined differences between an acoustic field impinging on the microphone and a desired acoustic audio signal field.

The housing preferably mounts a plurality of microphones, and is preferably in accordance with the sixth aspect of the invention described above to assist with the microphone noise cancellation.

The housing may be used in a communication system (such as a telephone system) but is not limited to such use.

This aspect of the invention may be utilized in combination with any or all of the above described aspects, to provide a complete noise cancellation system for a communications system, for example.

In such a system, advantageously all wanted audio signals are enhanced while unwanted signals are rejected leading to better quality, comfort and safety of personal audio communications.

BRIEF DESCRIPTION OF THE DRAWINGS

Features and advantages of the present invention will become apparent from the following description of embodiments thereof, by way of example only, with reference to the accompanying drawings, in which.

BEST MODE FOR CARRYING OUT THE INVENTION

Figure 1:
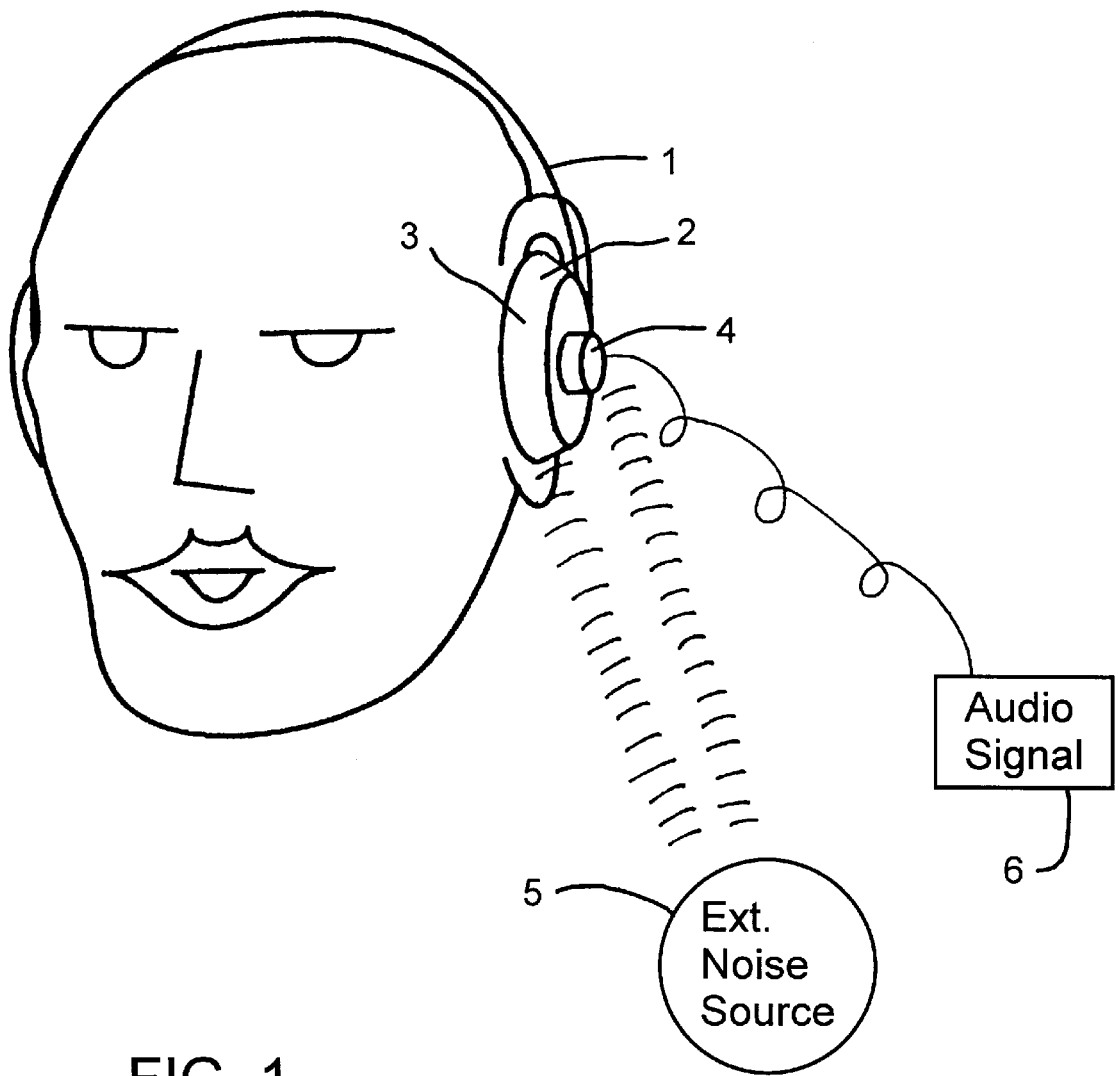
FIG. 1 is a schematic diagram illustrating a physical arrangement of a noise cancelling system in accordance with an embodiment of the present invention.

FIG. 1 shows a physical arrangement for a speaker/earphone noise cancelling arrangement in accordance with an embodiment of the present invention, which incorporates the first five aspects of the invention as discussed in the preamble.

A headset 1 mounts an earphone housing 2, which carries a speaker 3 arranged in use against the user's ear and a microphone 4 in the vicinity of the speaker 3 on the outside of the earphone housing 2. Circuitry is preferably mounted within the housing 2 to implement the noise cancelling system in accordance with the present invention, to attenuate unwanted external noise 5 whilst passing a high quality fidelity desired audio signal 6.

Figure 2A:
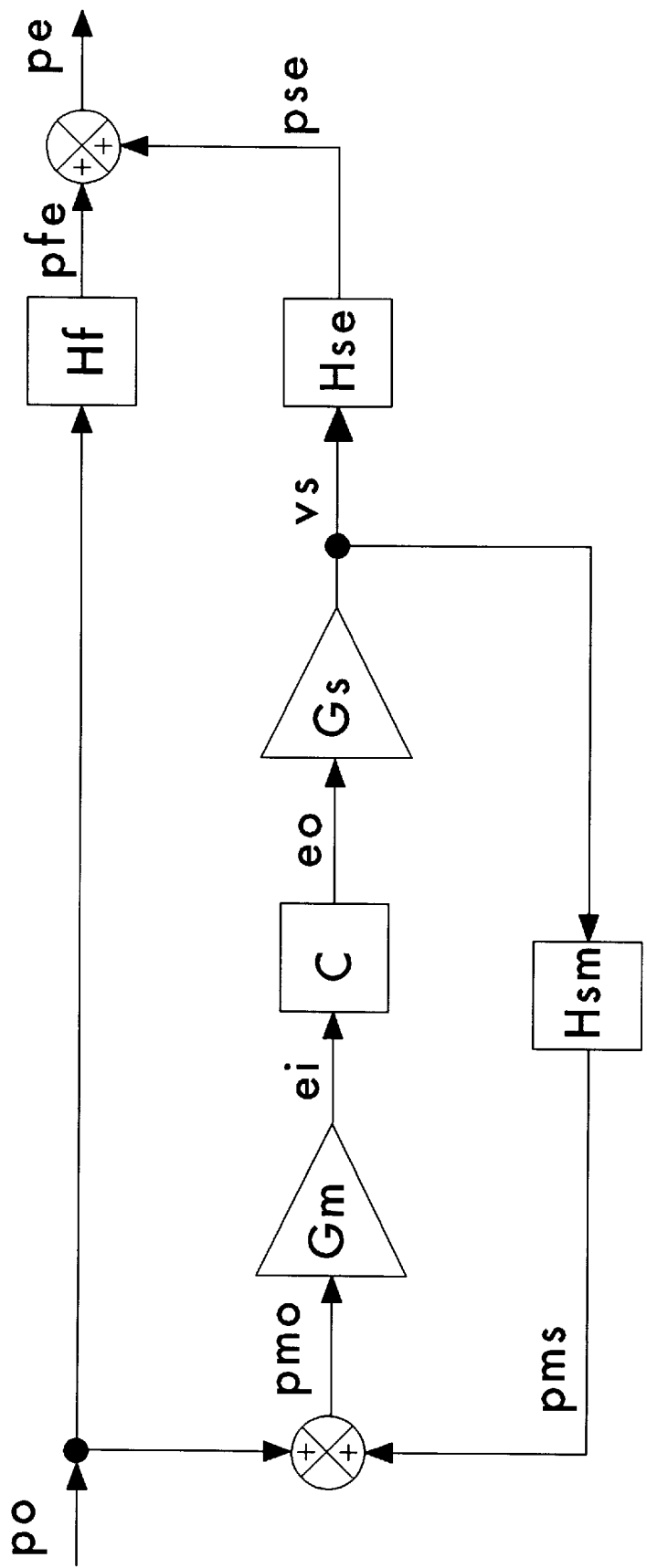
FIG. 2A is a closed loop block diagram for illustrating the required characteristics of a noise cancelling system in accordance with the present invention.

Referring to FIG. 2A, the symbols present on the blocks in the diagram are defined as follows:

po=External Noise, pressure at microphone. (used as REFERENCE pressure)
pms=Speaker Feedback pressure at microphone.
pm0=Total (po+pms) pressure at microphone
ei=Voltage output of microphone
eo=Voltage input to loud speaker
vs=Velocity of speaker "piston"
pfe=Free Ext. Noise, pressure at ear
pse=Speaker ANC pressure at ear
pe=Total (pfe+pse) pressure at ear
Gm=Microphone voltage resp. (volt/pascal)
C=Compensation filter network (voltOUT/voltIN)
Gs=Loud speaker velocity Resp. (m/sec/volt)
Hf=Free wave SPL Ifn. (mic–Ear) (pascalE/pascalM)
Hse=Speaker vel. Ear SPL Ifn (pascal/m/sec)
Hsm=Speaker vel. Mic. SPL Ifn (pascal/m/sec)

This figure illustrates a feedforward system with known audio signal input. The only signal input to the microphone is noise (po). In order to provide perfect noise cancellation the speaker (3in FIG. 1) must produce a noise signal pressure (pse) on the ear which is equal in magnitude to the free external noise pressure at the ear (pfe) and of opposite phase (phase difference). The noise (pfe) will then be cancelled.

Figure 3:
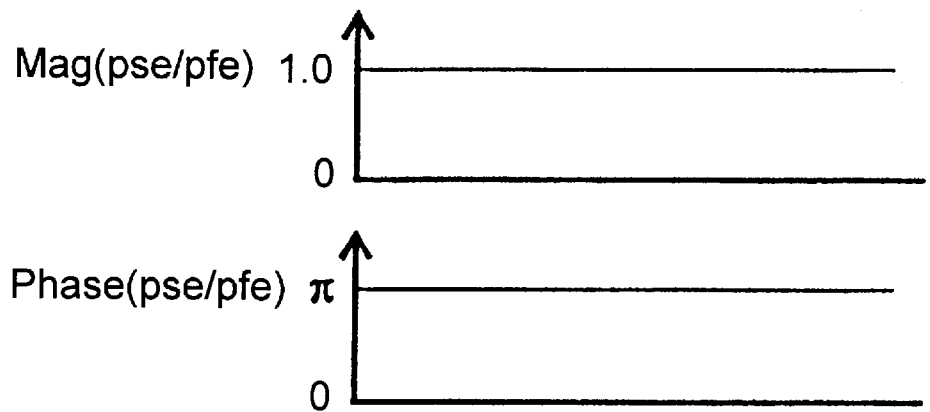
FIG. 3 is a schematic diagram showing the desired negative unity transfer function for a noise cancelling system in accordance with the present invention.

To provide such noise cancellation over a desired frequency range the electro-acoustic closed loop transfer function required for the noise cancelling system is one having "negative unity" as illustrated in FIG. 3. The magnitude transfer function Mag (pse/pfe) should desirably be 1.0 over the desired frequency range and the phase transfer function phase (pse/pfe) should be180° over the desired frequency range for noise cancelling. The apparatus described in relation to this embodiment of the present invention attempts to substantially provide such a negative unity transfer function for the noise cancelling system.

Figure 4:
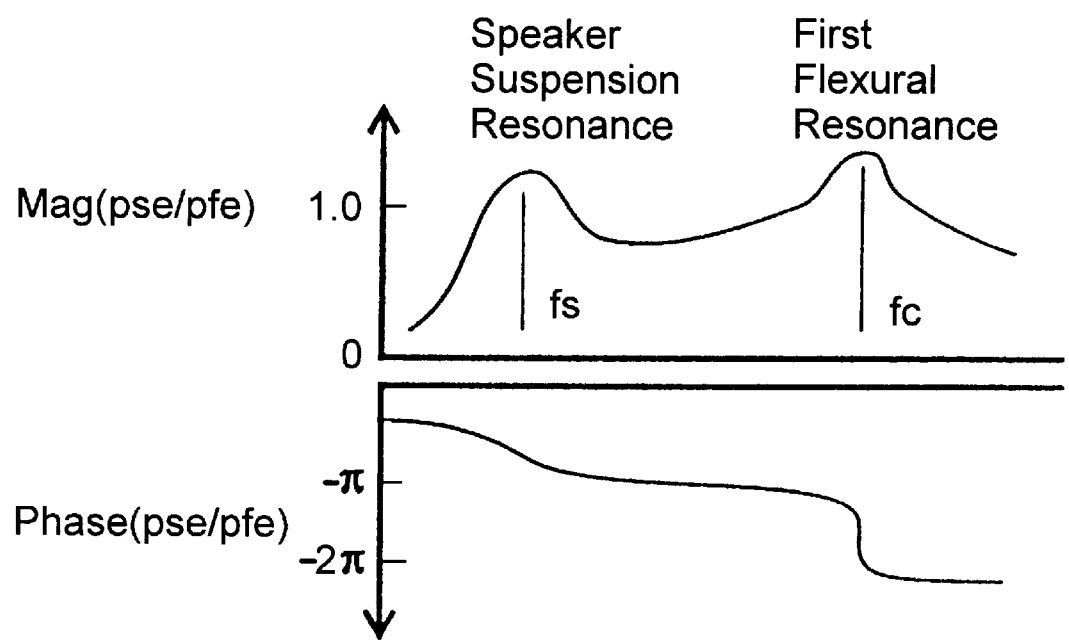
FIG. 4 is a schematic diagram illustrating a typical open loop transfer function for a microphone/speaker arrangement without noise cancelling.

Referring to FIG. 4 the open loop transfer function of a speaker/microphone arrangement is shown. Below the first flexural resonance frequency, as discussed in the preamble, the transfer function is mainly governed by the speaker suspension resonance characteristic, and the transfer function, both phase and magnitude, can be calculated for any particular speaker/microphone arrangement. The frequencies below the first flexural resonance frequency are those one is generally interested in with regard to noise cancelling.

The first embodiment of the invention shown in FIGS. 1 and 2A, operates substantially as a feedforward system, with respect to control of noise at the listener's ear. The closed loop electro-acoustic transfer function is required to be equal magnitude and opposite phase with respect to the free noise propagation transfer function Hf in FIG. 2A. This is approximately negative unity, up to the flexural resonance of the electro-accoustic system.

In a second embodiment of the invention, a second microphone can be placed inside the earphone assembly, adjacent to the loudspeaker and as close as possible to the listener's auditory canal. The internal microphone signal can be applied in a closed loop to drive the earphone loudspeaker, in a feedback configuration. If the gain is adjusted sufficiently high, the pressure at the microphone is always driven to a very low value, thus providing noise cancellation at or very near the listener's ear.

To avoid negative feedback instability, using an inner microphone in the second embodiment, the invention includes a special low pass filter which attenuates the gain and always maintains a positive phase margin above—180 degrees in the Open Loop Transfer Function (OLTF).

Figure 2B:
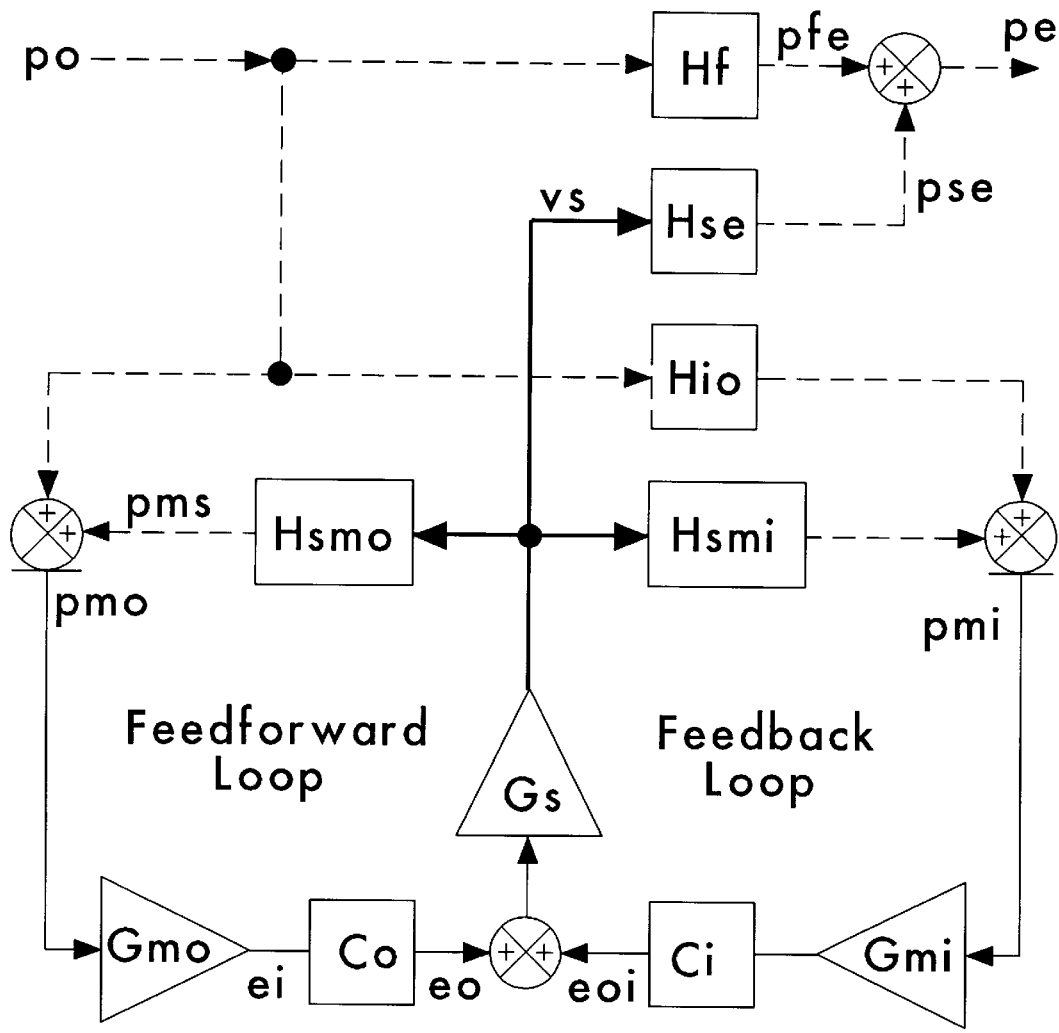
FIG. 2B is a closed loop diagram for illustrating the required characteristics of a noise cancelling system in accordance with an alternative embodiment of the present invention.

In a third embodiment of the invention shown in FIG. 2B, it is possible to combine the feed forward and feedback circuits with closed loop control signals being summed with appropriate phasing and amplitude weighting to affect a greater noise cancelling effect at the listener's ear. One application of the invention is to use the inner microphone feedback loop with low pass filter stability compensation to cancel noise at low frequencies, and to high pass filter the feedforward loop using the outer microphone loop, to provide noise cancellation at higher frequencies up to and including the first flexural resonance frequency in the feedforward closed loop transfer function. The terms used in FIG. 2B and their definitions are as follows:

Hoi=acoustic pressure transfer function outside to inside microphone positions (Pa,Pa)
eoi=voltage output of inside microphone
Ci=low pass compensation filter network
Co=high pass compensation filter network
Gmi=inside microphone voltage response
Gmo=outside microphone voltage response.
Hsmi=speaker velocity to inside microphone transfer function (Pa/m/sec)
Hsmo=speaker velocity to outside microphone transfer function (Pa/m/sec)
Pmi=total sound pressure at inside microphone (Pa)
Pmo=total sound pressure at outside microphone Referring to FIG. 5, a cancellation loop block 8 is provided to provide transfer compensations having an open loop transfer function of the microphone/speaker arrangement over the desired frequency range, whereby the closed loop transfer function over the desired range approaches negative unity.

Figure 5:
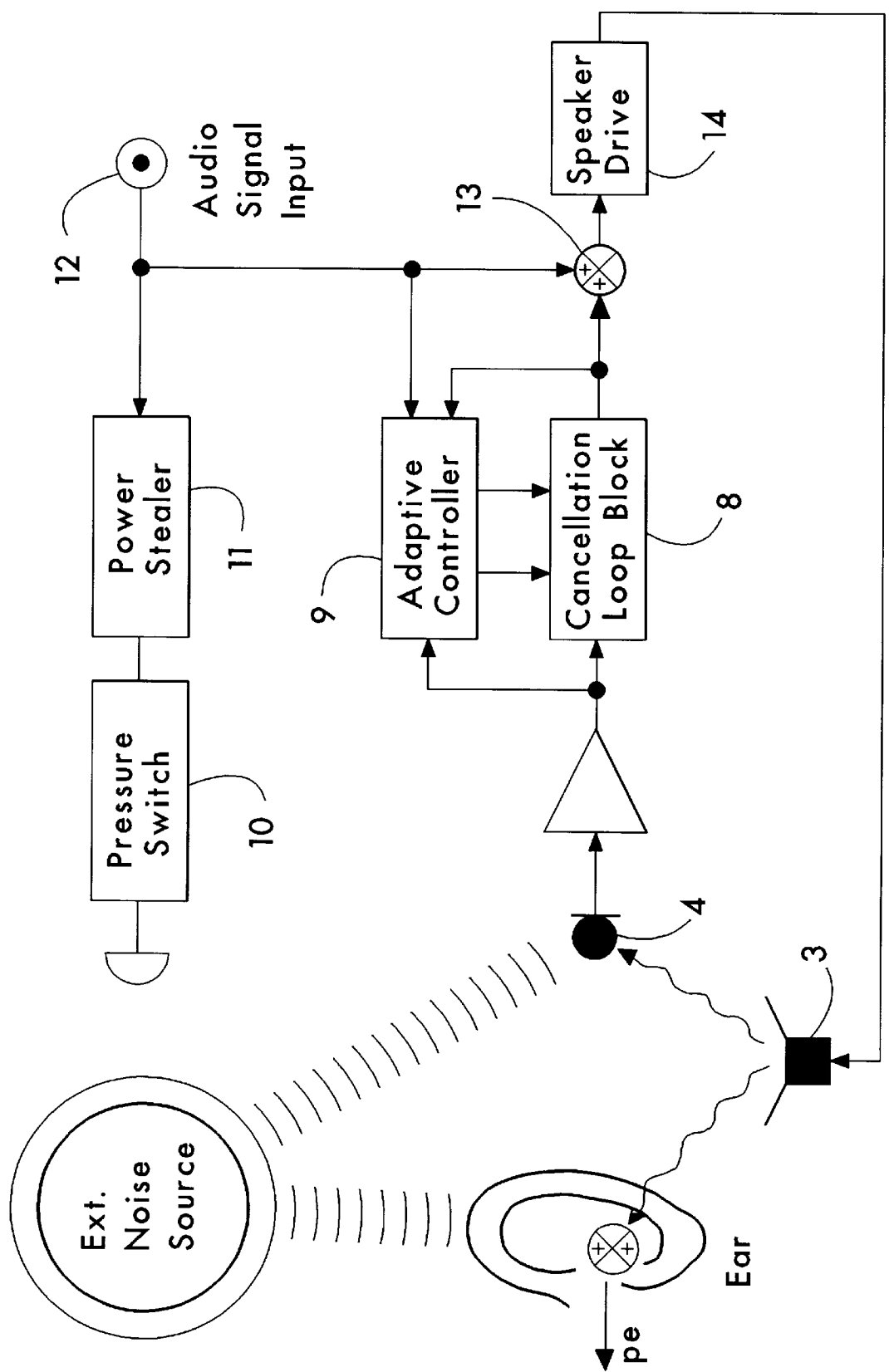
FIG. 5 is a schematic block diagram of a noise cancelling system in accordance with an embodiment of the present invention.

The system illustrated generally in FIG. 5 comprises, as well as the cancellation loop block, an adaptive controller block 9 in accordance with the present invention, a power application pressure switch 10 in accordance with the present invention, a power stealing circuit 11 in accordance with the present invention, an audio signal input 12 and summing circuit 12 for summing the audio signal with the produced noise cancelling signal, and speaker drive circuit 14 (which may be conventional). Earphone loudspeaker 3 and microphone 4 are also illustrated.

Figure 6:
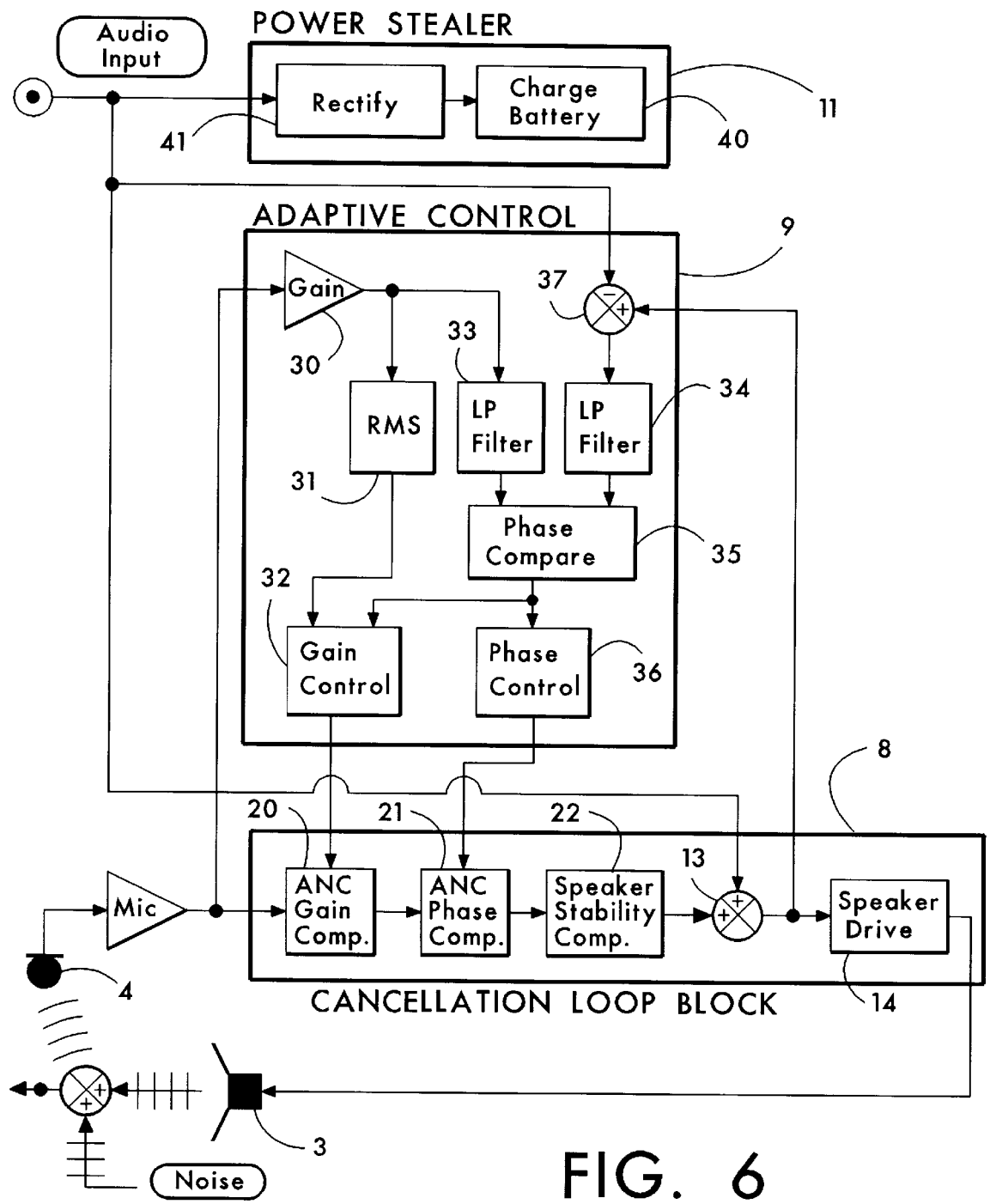
FIG. 6 is a more detailed schematic block diagram of the noise cancelling system of FIG. 5.

The cancellation loop block is shown in more detail in FIG. 6. It comprises a two stage filter, being a separate gain block 20 and phase block 21 for providing compensation to the feedback noise cancelling arrangement in accordance with the inverse of the open loop transfer function of the speaker/microphone arrangement.

The cancellation loop block 8 also includes a speaker stability compensation block 22, in accordance with the second aspect of the present invention, as discussed in the preamble, to provide audio feedback stability compensation.

The audio stability compensation function of the block 22 compensates for the predominant speaker resonance, present in all cone suspension speakers, and makes it possible to provide the gain necessary for good cancellation without instability feedback problems. The function is provided by a high Q filter set at the frequency resonance point.

The output of the speaker stability compensation block 22 is the noise cancelling signal. Where it is only wished to cancel noise, and not to pass an audio signal, this signal would be used to drive the speaker 3 via the speaker drive 14 (e.g. in an "ear protector"). In this embodiment, however, an external audio signal is summed with the noise cancelling signal in summing circuit 13, so that a noise reduced audio signal will be passed to the user.

Adaptive control block 9 provides adaptive control compensation for any variations in the electro-acoustic closed loop transfer function, caused by movement of the earphone, for example, as discussed in relation to the third aspect of the present invention. The adaptive control block 9 comprises a gain circuit, 30 RMS (root mean square) block 31, gain control 32, low pass filters 33, 34, phase comparison block 35 and phase control block 36. A summing circuit 37 is also provided to which the audio signal is input.

The adaptive control block 9 compares the noise cancellation signal output from the summing circuit 13 with the microphone signal to detect residual noise, and controls the gain compensation 20 and phase compensation 21 to keep the residual noise to a minimum. Also by negatively summing the audio signal into the adaptive control loop the loop will affect the compensation of the cancellation loop block to provide a high fidelity output signal, notwithstanding quality of components, as discussed in the preamble.

The gain section 20 is gain controlled by the external adaptive controller loop. The gain must be controlled to cause accurate matching of the out of phase signal driving the speaker to cause effective noise cancellation.

The phase compensation 21 performs the phase adjustment necessary to reverse the effect of the time delay and phase shift existing between the speaker, the ear and the microphone. This phase matching is necessary to provide effective noise cancellation. The primary phase compensation characteristic, the breakpoints, are adjusted by the adaptive controller to help match the cancellation accurately by adjusting for varying phase shifts dependent on speaker to head position.

A pressure switch 10 is provided which is only actuated when the earpiece abuts the users ear, to switch in power when this occurs.

Also, a power stealer 11, in accordance with the fifth aspect of the present invention is provided to take power from the audio input signal to charge a battery 40 which provides power to the noise cancellation system circuitry. The block 11 comprises a rectifier 41 for rectifying the signal to charge the battery 40.

Figure 7:
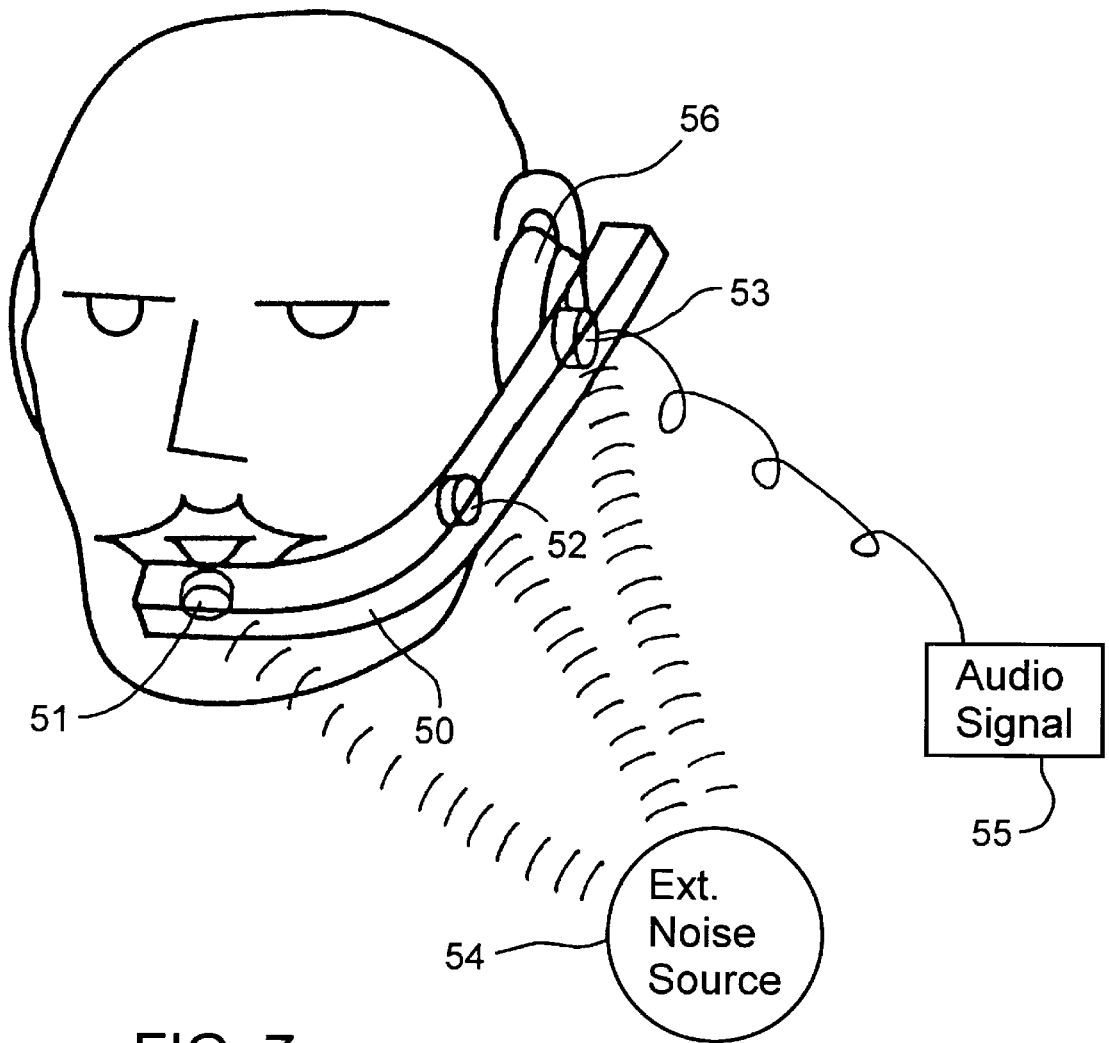
FIG. 7 is a schematic block diagram illustrating a physical arrangement of a microphone noise cancelling system in accordance with an embodiment of the present invention.

FIG. 7 shows the physical arrangement of a noise cancellation communication device in accordance with an embodiment of the present invention, incorporating a microphone noise cancelling arrangement in accordance with embodiments of the sixth and seventh aspects of the present invention, respectively.

The microphone noise cancelling system comprises a handset 50 and three substantially equally spaced microphones 51, 52, 53. Microphone noise cancelling circuitry (not shown) is mounted in the handset 50 for electrically attenuating unwanted noise 54 received by the microphones 51, 52, 53 and passing the required audio signal through the communications system ( in this case it is desired that the users voice signal be passed).

Received signals 55, i.e. from another user of the communications system, are passed to the user via speaker 56. Speaker 56 and microphone 53 form a noise cancelling arrangement in accordance with the first aspects of the present invention (i.e. aspects one to five), together with appropriate noise cancelling circuitry (not shown) mounted in the handset 50. By cancelling microphone noise, and ambient noise adjacent the listener's ear, a communication where the majority of noise is attenuated is provided.

Figure 8:
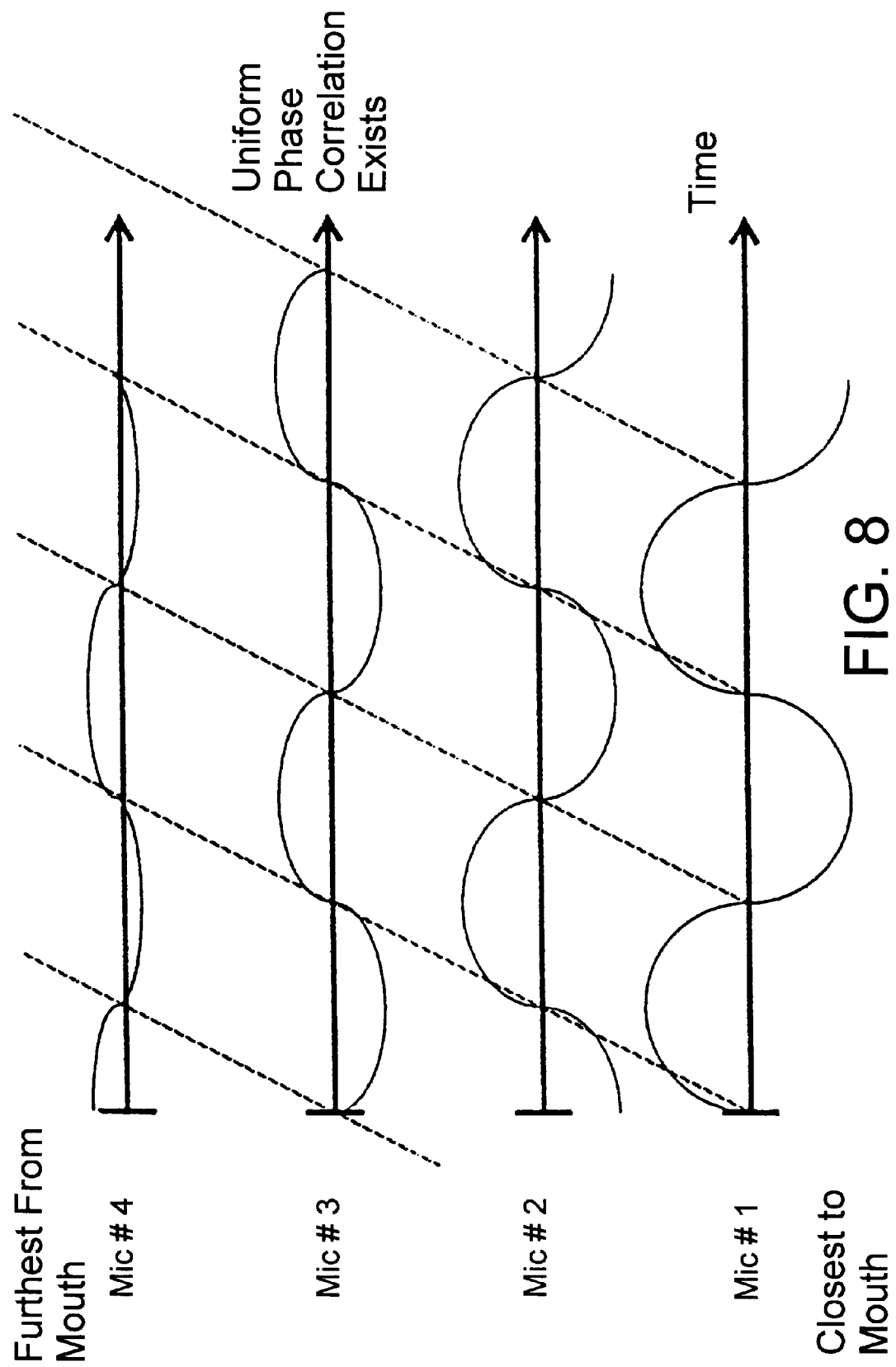
FIG. 8 is a schematic diagram illustrating typical characteristics of an audio signal waveform issuing from a localized source and being received by four evenly spaced microphones, at the microphones.
Figure 9:
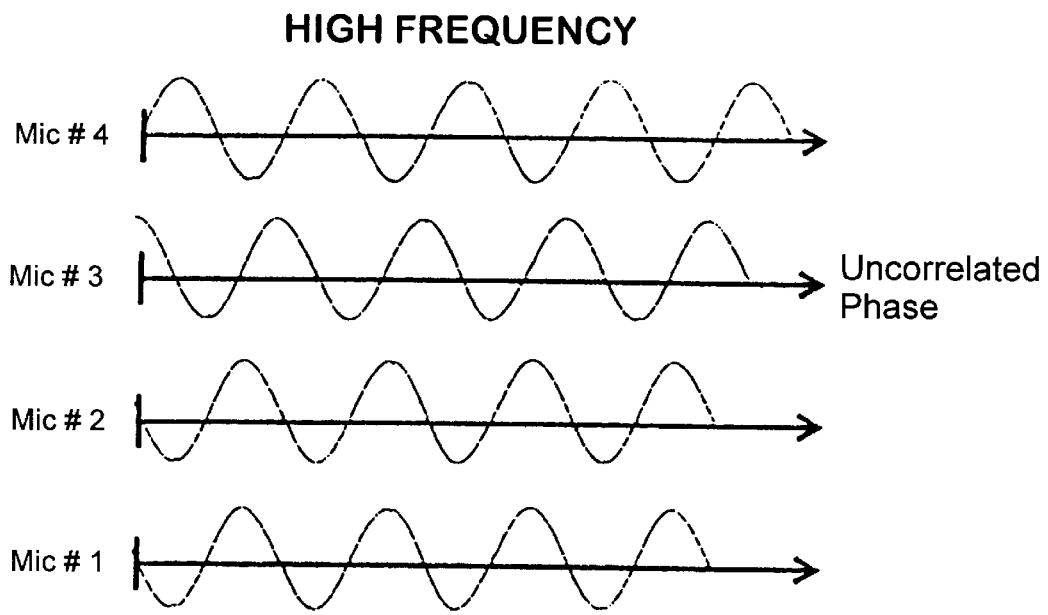
FIG. 9 is a schematic diagram illustrating typical characteristics of an ambient high frequency noise signal being received by four evenly spaced microphones at the microphones.
Figure 10:
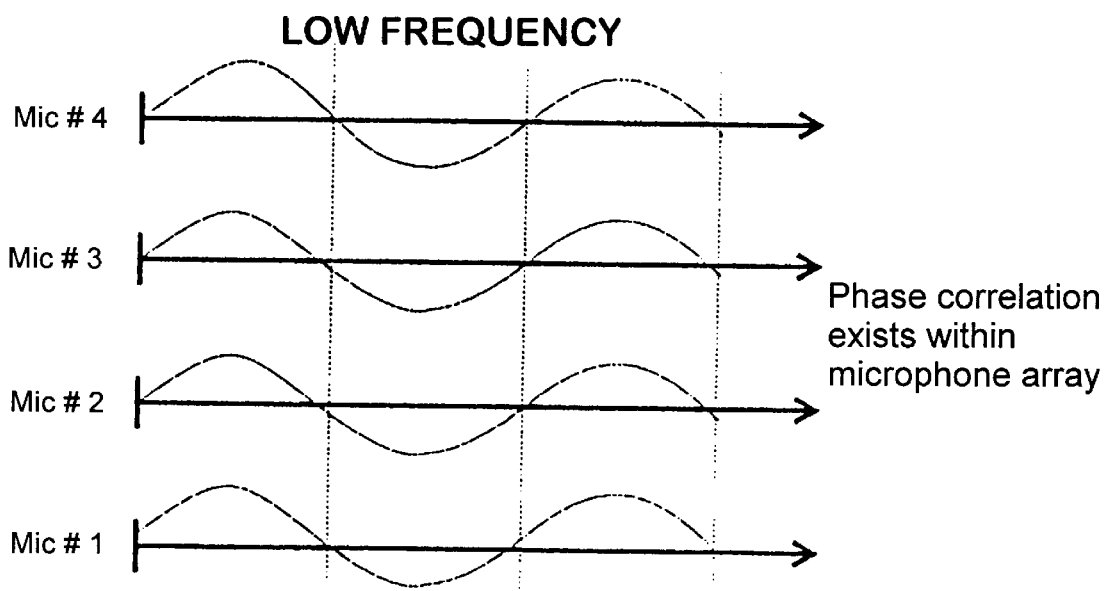
FIG. 10 is a schematic diagram illustrating typical characteristics of an ambient low frequency noise signal being received by four evenly spaced microphones, at the microphones.

FIGS. 8 through 10 illustrate the characteristics of different types of signals being received by four equally spaced microphones. FIG. 8 illustrates the effect of microphone spacing on a speech signal issuing from a single source, and FIGS. 9 and 10 illustrate the effect of microphone spacing on high frequency ambient noise and low frequency ambient noise respectively.

At noise wave lengths shorter than the microphone spacing, the microphone signals in a diffuse reverberant sound field (associated with external noise in a room) will be equal in amplitude, but phase uncorrelated as shown in FIG. 9. A property of the zero phase correlation is that the noise signals sum in a Root Mean Square manner even when the signals are gain-weighted or phase shifted by any processing system.

By contrast the speaker's voice sound field attenuates with distance away from the mouthpiece microphone #1, and propagates with a uniform phase correlation between the array microphones, as shown in FIG. 8.

At low frequencies, when the wave length of sound is of the order of the microphone spacing, or longer, the diffuse reverbant noise field at the "n" microphone approach the low frequency case shown in FIG. 10, where all microphones see the same amplitude, phase correlated noise wave form.

Figure 11:
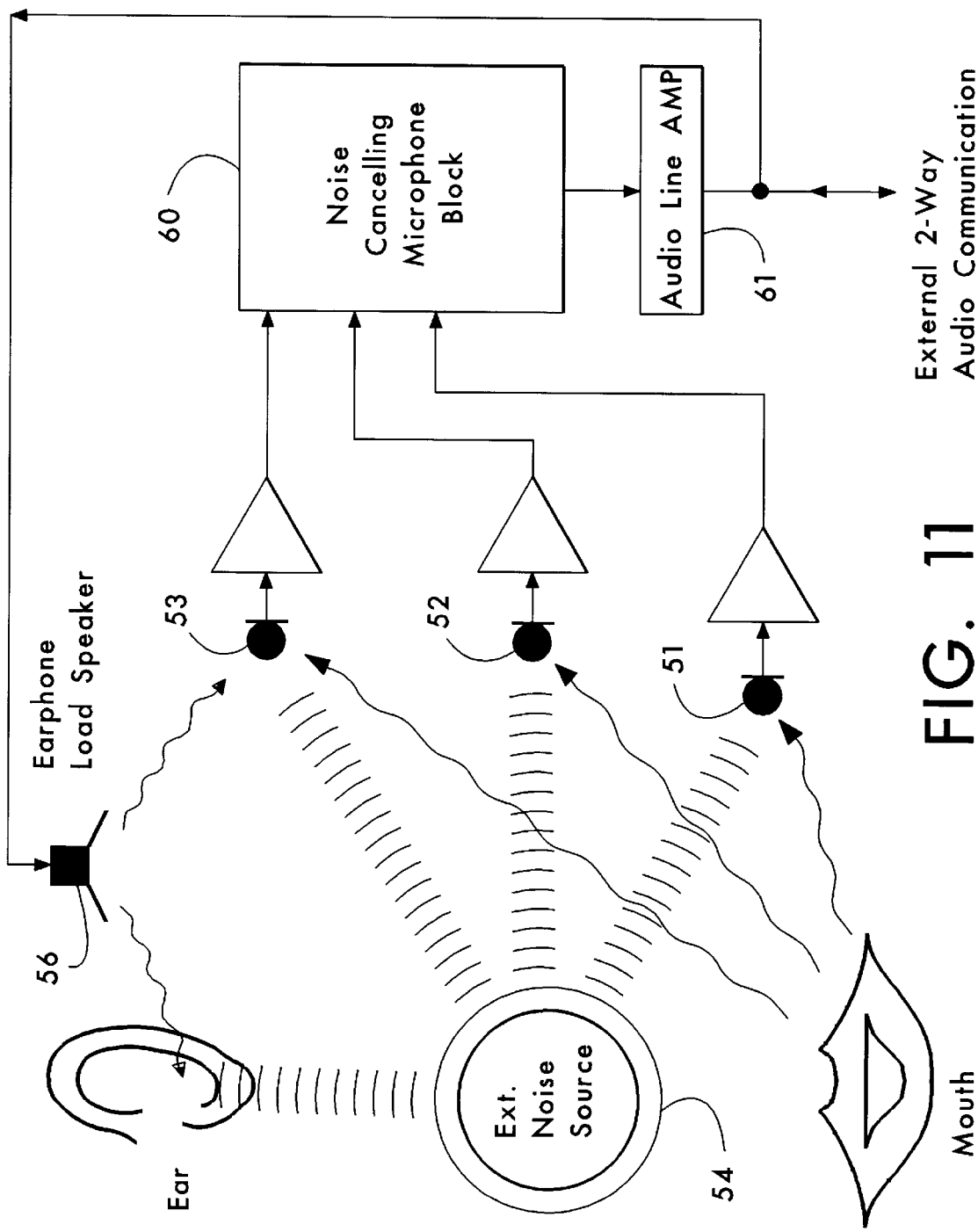
FIG. 11 is a schematic block diagram of a microphone noise cancelling system in accordance with an embodiment of the present invention.
Figure 12:
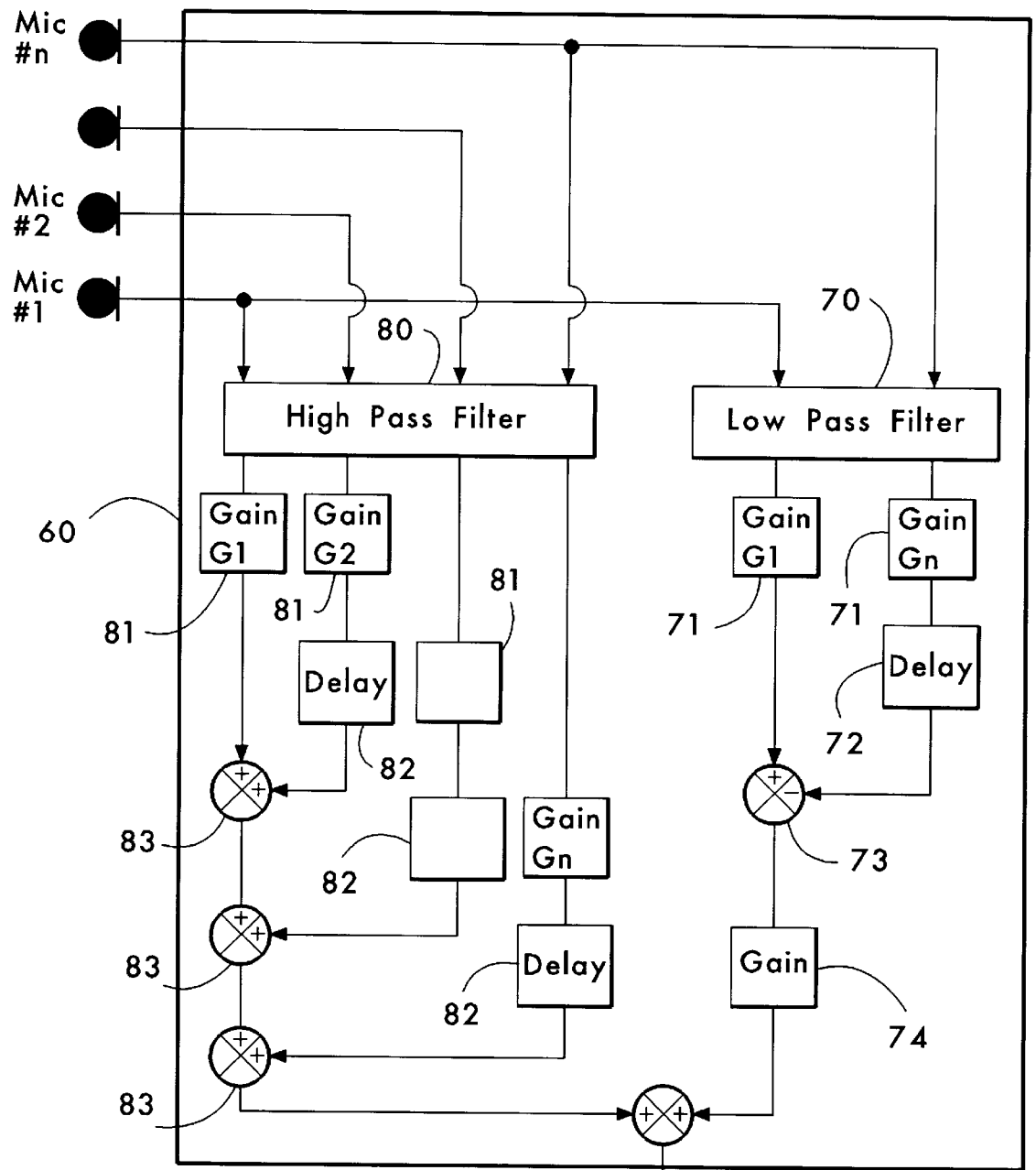
FIG. 12 is a more detailed schematic block diagram illustrating details of the noise cancelling microphone block of FIG. 11.

With reference to FIG. 11, the noise cancelling circuitry can be seen to comprise a noise cancelling block 60 to which signals from all the microphones, 51, 52, 53 are fed. The noise cancelling block 60 is shown in more detail in FIG. 12, and can be seen to basically be comprised of two sections, one section for treating high frequency signals and the other for treating low frequency signals.

The low frequency section comprises low pass filter 70, gain and delay blocks 71, 72 a negative summing unit 73 and a further gain block 74.

This high pass frequency segment provides for a weighted and phase-shifted sum of the "n" microphone signals; containing both phase correlated speaker's voice and uncorrelated external noise signals. The invention allows for the adjustment of signal weighting and phase shifting to amplify the speakers voice signal and attenuate the external noise.

The high frequency sections comprises a high pass filter 80 and a plurality of gain and delay blocks 81, 82, respectively, as well as a plurality of positive summing circuits 83. The low pass frequency filter may also comprise a plurality of circuits 71, 72, 73.

The low pass frequency segment of the invention provides for a weighted and phase-shifted subtraction of noise from the mouthpiece microphone signal. The invention allows for adjustment of gain weighting and phase shift to find the optimum improvement in signal to noise ratio, in any specific reverberant noise environment.

The block 60 further provides for the weighted summing via summing circuit 90 of low passed and high passed signals to reconstitute the total enhanced signal.

This is passed to audio line amplifier 61.

Figure 13:
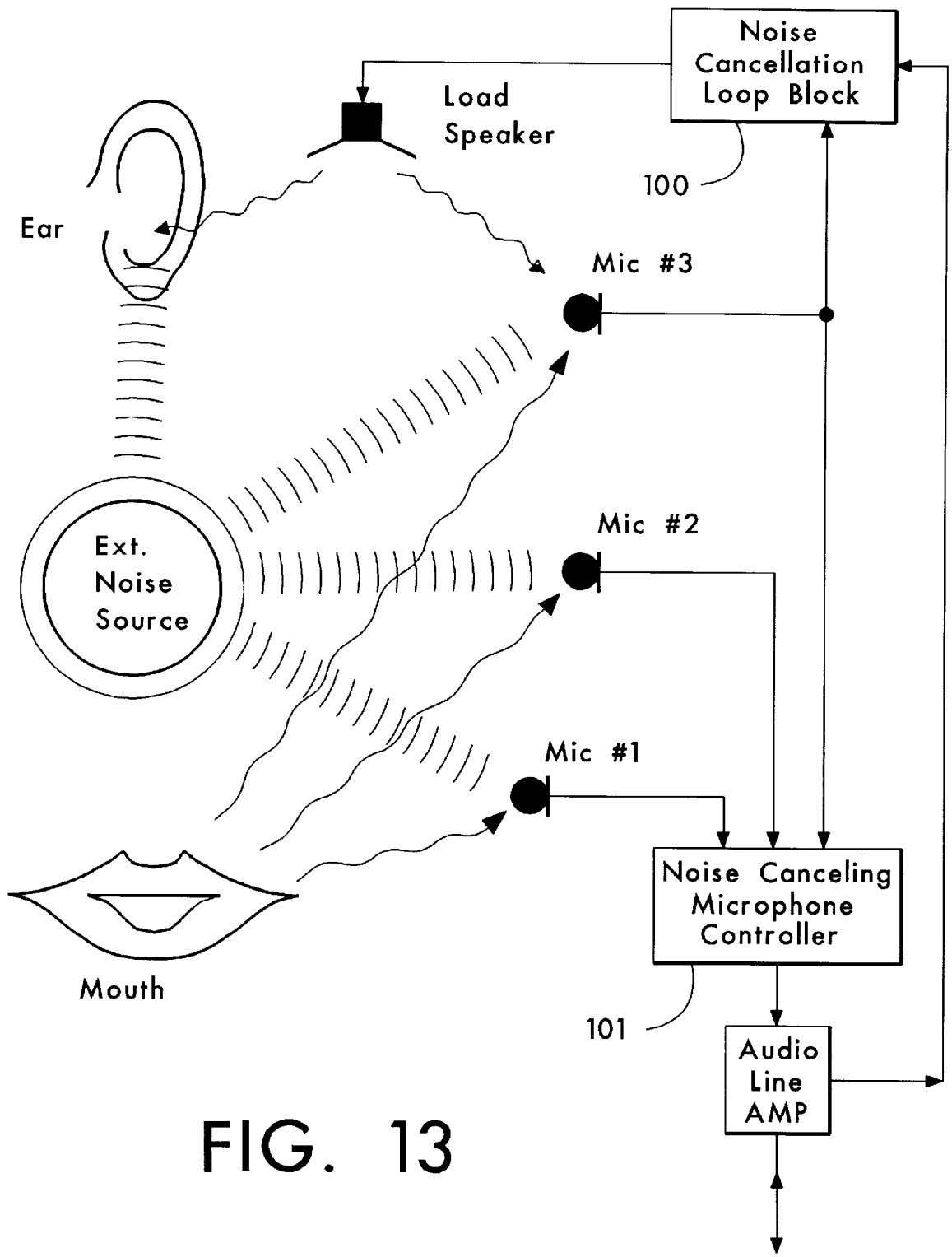
FIG. 13 is a schematic block diagram of a noise cancelling communication device in accordance with an embodiment of the present invention.

FIG. 13 illustrates a two way audio communications system incorporating all aspects of the present invention. Noise cancelling at the ear is governed by headset controller 100, and microphone noise cancelling is governed by microphone controller 101. The handset 50 is acoustically designed to emphasized the difference between the speech and noise signals.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A system for attenuating acoustic noise energy at a listener's ear comprising:
    (a) sum signal transducer means, responsive to a sum signal, for producing acoustic energy corresponding to said sum signal, the sum signal transducer being closely coupled acoustically with the ear to enable the produced acoustic energy to attenuate noise energy at said listener's ear;
    (b) the sum signal transducer means being part of a feedforward circuit which further comprises:
        (1) first transducer means, disposed external to the close acoustical coupling, for converting ambient noise energy to a corresponding first signal, and
        (2) means for applying compensation to the first signal resulting in a second signal, said compensation including compensation for undesirable feedback from the sum signal transducer to the first transducer means;
    (c) the sum signal transducer also being in a closed loop feedback circuit which further comprises:
        (1) second transducer means, internal to the close acoustical coupling, for converting impinging acoustic energy to a corresponding third signal, and
        (2) means for applying compensation to the third signal resulting in a fourth signal; and
    (d) means for summing the second and fourth signals to produce said sum signal, the compensations of both circuits cooperating to cause an overall transfer function to attenuate noise energy at the listener's ear over a predetermined frequency range.

2. System according to claim 1 further comprising means for actuating energization for the system by physical contact with a listener's ear.

3. The system according to claim 1 wherein the feedback circuit further comprises compensation means for inhibiting negative feedback instability.

4. The system according to claim 3 wherein the compensation means comprises a notch filter having a center frequency that is a first flexural resonance frequency of the sum signal transducer means.

5. The system according to claim 3 wherein the compensation means for inhibiting negative feedback instability comprises a low pass filter which attenuates the gain and maintains a positive phase margin above 180°.

6. The system according to claim 1 wherein the predetermined frequency range comprises the frequencies at and below a first flexural resonant frequency of the sum signal transducer means, and wherein the closed loop transfer function of the feedback circuit attenuates acoustic noise energy within a range at the low frequency end of said predetermined frequency range, and wherein the transfer function of the feedforward circuit attenuates acoustic noise energy within a range at the high frequency end of said predetermined frequency range.

7. The system according to claim 6 further comprising phase compensation means for frequencies above the first flexural resonance frequency of the sum signal transducer means to inhibit audio feedback instability.

8. The system according to claim 1 further comprising means for adapting the at least one means for applying compensation to variations in operating characteristics comprising:
    (a) means for comparing predetermined parameters of the input and output signals of said at least one means for applying compensation, and
    (b) means for adjusting the said at least one means for applying compensation in accordance with the comparison.

9. The system according to claim 8 wherein the means for comparing the predetermined parameters comprises means for low pass filtering each of the input and output signals and means for comparing the phase of the filtered signals, and wherein the means for adjusting the transfer function comprises means responsive to the phase comparison for adjusting phase compensation of the at least one means for applying compensation, and means responsive to both the phase comparison and the root mean square of the input signal for adjusting gain compensation of the at least one means for applying compensation.

10. The system according to claim 1 further comprising a microphone apparatus for converting desired acoustic energy to an audio signal for communication elsewhere, the apparatus comprising:
    (a) a plurality of spaced microphones at known positions in relation to a source of the desired acoustic energy, each microphone being disposed for receiving the desired acoustic energy, at least one of the microphones comprising the first transducer, and
    (b) means for processing the signals from each microphone to attenuate ambient noise from the audio signal, the processing being according to an algorithm utilizing known propagation characteristic differences between ambient acoustic noise energy and the desired acoustic energy.

11. The system according to claim 10 further comprising means for applying one such algorithm adapted to high frequencies, frequencies having wave lengths generally shorter than the microphone spacing, and another such algorithm adapted to low frequencies, frequencies having wave lengths generally on the order of the microphone spacing or longer, and means for summing the resultant signals.

12. The system according to claim 11 further comprising a housing for mounting the plurality of microphones, said housing being shaped to emphasize said differences between ambient acoustic noise energy propagation and the desired acoustic energy propagation.

13. A device for canceling acoustic noise energy in the vicinity of a listener's ear comprising:
   (a) first transducer means, disposed proximate the listener's ear and responsive to a first signal, for producing corresponding acoustic energy,
   (b) second transducer means for converting the acoustic noise energy to a corresponding second signal, the first and second transducer means being in a closed loop system wherein the acoustic energy produced by the first transducer means feeds back and impinges the second transducer means, the acoustic noise energy being an input to the closed loop, the acoustic energy produced by the first transducer means also feeding forward to impinge the listener's ear, and
   (c) means for notch filtering the second signal to produce the first signal, said means having a relatively sharp gain roll-off to the notch center frequency which is the first flexural resonance frequency of the first transducer means, and further having an increasing phase characteristic at the notch center frequency to provide a phase margin for frequencies above the first flexural resonance frequency, a total transfer function of the closed loop attenuating noise energy over a predetermined frequency range, the two acoustic energies being summed by the listener's ear.

14. Device according to claim 13 further comprising means for actuating energization for the device by physical contact with a listener's ear.

15. For an acoustic noise energy cancelling system having a noise detecting microphone electrically connected through a compensation circuit to drive a speaker to produce acoustic energy for attenuating the noise energy, a device for adapting the system to variations in operating characteristics at frequencies within a predetermined range, the device comprising means for adapting gain and phase characteristics of the compensation circuit based on a priori knowledge of the transfer functions of the system components, and in particular a two-pole model of the speaker's suspension resonance characteristics.

16. The system according to claim 15 further comprising:
   (a) first transducer means, responsive to a first signal, for producing corresponding acoustic energy,
   (b) means for closely coupling acoustically the first transducer means with the listener's ear,
   (c) second transducer means for converting the noise energy to a corresponding second signal, the second transducer means being disposed in close proximity to the listener's ear but sufficiently external to the close acoustical coupling for the second signal to contain phase leading information related to the noise energy, and
   (d) means for applying compensation to the second signal resulting in the first signal, the compensation causing a transfer function to attenuate noise energy at the listener's ear for frequencies at or below the first flexural resonance of the first transducer means, the compensation being derived at least in part from a mathematical model of the fundamental resonance characteristics of the first transducer means.

17. A device for canceling ambient acoustic noise both at a listener's ear and in transmitted audio comprising:
   (a) first transducer means, disposed proximate the listener's ear and responsive to a first signal, for producing corresponding acoustic energy;
   (b) second transducer means for converting the acoustic noise energy to a corresponding second signal, the first and second transducer means being in a closed loop system wherein the acoustic energy produced by the first transducer means feeds back and impinges the second transducer means, the acoustic noise energy being an input to the closed loop, the acoustic energy produced by the first transducer means also feeding forward to impinge the listener's ear;
   (c) means within the closed loop for applying compensation to the first signal resulting in the second signal, the compensation causing the closed loop transfer function to attenuate noise energy at the listener's ear over a predetermined frequency range, the two acoustic energies being summed by the listener's ear; and
   (d) an apparatus for converting desired acoustic energy to an audio signal for communication elsewhere comprising:
      (1) a plurality of spaced microphones at known positions in relation to a source of the desired acoustic energy, each microphone being disposed for receiving the desired acoustic energy, at least one of the microphones comprising the second transducer means, and
      (2) means for processing the signals from each microphone to attenuate ambient noise from the audio signal, the processing being according to an algorithm which uses known differences between the directivity and spatial correlation of the ambient acoustic noise energy and the desired acoustic energy.

18. For an acoustic noise energy cancelling system including a noise detecting microphone connected through a compensation circuit to drive a speaker to produce acoustic energy for attenuating the noise energy at a listener's ear, an apparatus for converting desired acoustic energy to an audio signal for communication elsewhere, the apparatus comprising:
   (a) a plurality of spaced microphones at known positions relative to a source of the desired acoustic energy, each microphone being disposed for receiving the desired acoustic energy, at least one of the spaced microphones comprising the noise detecting microphone, and
   (b) means for processing the signals from each microphone to attenuate ambient noise from the audio signal, the processing being according to an algorithm which uses known differences between the directivity and spatial correlation of the ambient acoustic noise energy and the desired acoustic energy.

19. The device according to claim 18 further comprising a housing for mounting the plurality of microphones, said housing being shaped to emphasize said differences between ambient acoustic noise energy propagation and the desired acoustic energy propagation.

20. The device according to claim 18 further comprising means for applying one such algorithm adapted to high frequencies, frequencies having wave lengths generally shorter than the microphone spacing, and another such algorithm adapted to low frequencies, frequencies having wave lengths generally on the order of the microphone spacing or longer, and means for summing the resultant signals.

21. The device according to claim 20 wherein the algorithm adapted to high frequencies comprises:
   (a) amplification of each microphone signal by an amount sufficient to offset the known attenuation of the source audio signal emanating from known source location, (b) phase-shifting of each microphone signal by an amount equal to, but opposite in phase to the known lag of the source signal at each microphone, and (c) summing of the amplified and phase-shifted microphone signals so as to cancel the noise through interference of multiple uncorrelated signals and improve the signal-to-noise ratio of the desired source audio signal.

22. The device according to claim 20 wherein the algorithm adapted to low frequencies comprises:

(a) selection of two or more microphone signals which for the case of known source location are also known to experience the greatest difference in magnitude of signal from the desired acoustic source;

(b) application of known or measurable gain and phase-shifting of the two or more microphone signals to achieve approximately the same amplitude and in-phase representation of the known or assumed specific unwanted noise field at low frequencies;

(c) differencing of two or more amplified and phase-shifted signals to cancel the unwanted noise common to these signals and thus leave a residual signal proportional to the desired audio source signal at low frequencies; and (d) amplification of the difference signal to recover a single audio source signal with signal-to-noise ratio better than any of the individual microphone signals.

23. A device for canceling ambient acoustic noise energy present at a microphone to prevent the noise from becoming part of the signal being transmitted from the microphone comprising:

(a) a plurality of spaced microphones at known positions relative to a source of desired acoustic energy, each microphone being disposed for receiving the desired acoustic energy, and (b) means for processing the signals from each microphone to attenuate ambient noise from the audio signal, the processing being according to an algorithm which uses known differences between the directivity and spatial correlation of the ambient acoustic noise energy and the desired acoustic energy.

24. The device according to claim 23 further comprising means for applying one such algorithm adapted to high frequencies, frequencies having wave lengths generally shorter than the microphone spacing, and another such algorithm adapted to low frequencies, frequencies having wave lengths generally on the order of the microphone spacing or longer, and means for summing the resultant signals.

25. The device according to claim 24 wherein the algorithm adapted to high frequencies comprises:

(a) amplification of each microphone signal by an amount sufficient to offset the known attenuation of the source audio signal emanating from known source location, (b) phase-shifting of each microphone signal by an amount equal to, but opposite in phase to the known lag of the source signal at each microphone, and (c) summing of the amplified and phase-shifted microphone signals so as to cancel the noise through interference of multiple uncorrelated signals and improve the signal-to-noise ratio of the desired source audio signal.

26. The device according to claim 24 wherein the algorithm adapted to low frequencies comprises:

(a) selection of two or more microphone signals which for the case of known source location are also known to experience the greatest difference in magnitude of signal from the desired acoustic source;

(b) application of known or measurable gain and phase-shifting of the two or more microphone signals to achieve approximately the same amplitude and in-phase representation of the known or assumed specific unwanted noise field at low frequencies;

(c) differencing of two or more amplified and phase-shifted signals to cancel the unwanted noise common to these signals and thus leave a residual signal proportional to the desired audio source signal at low frequencies; and (d) amplification of the difference signal to recover a single audio source signal with signal-to-noise ratio better than any of the individual microphone signals.

27. The device according to claim 23 further comprising a housing for mounting the plurality of microphones, said housing being shaped to emphasize said differences between ambient acoustic noise energy propagation and the desired acoustic energy propagation.

* * * * *